(12) United States Patent
Topps (10) Patent No.: US 11,917,061 B2
(45) Date of Patent: Feb. 27, 2024

(54) DECENTRALIZED AND/OR HYBRID DECENTRALIZED SECURE CRYPTOGRAPHIC KEY STORAGE METHOD

(71) Applicant: Barbara Jean Wilk, Nesconset, NY (US)

(72) Inventor: Ryan Joseph Topps, Nesconset, NY (US)

( * ) Notice: Subject to any disclaimer, the term of this patent is extended or adjusted under 35 U.S.C. 154(b) by 1097 days.

(21) Appl. No.: 16/396,367

(22) Filed: Apr. 26, 2019

(65) Prior Publication Data
US 2020/0344055 A1    Oct. 29, 2020

(51) Int. Cl.
*H04L 9/08* (2006.01)
*H04L 9/06* (2006.01)
*H04L 9/14* (2006.01)

(52) U.S. Cl.
CPC .......... *H04L 9/0897* (2013.01); *H04L 9/0643* (2013.01); *H04L 9/14* (2013.01)

(58) Field of Classification Search
USPC .......................................................... 713/171
See application file for complete search history.

(56) References Cited

U.S. PATENT DOCUMENTS

| | | | |
|---|---|---|---|
| 7,478,248 B2 | 1/2009 | Ziv et al. | |
| 9,953,315 B2 | 4/2018 | Collinge et al. | |
| 2011/0305342 A1* | 12/2011 | Manaka | G06F 21/10 380/286 |
| 2016/0117124 A1 | 4/2016 | Kwon | |
| 2017/0012951 A1* | 1/2017 | Mennes | H04L 9/0891 |
| 2018/0293407 A1* | 10/2018 | Wu | G06F 21/602 |
| 2020/0082088 A1* | 3/2020 | Muthukumaran | G06F 21/64 |

* cited by examiner

*Primary Examiner* — Sanchit K Sarker (57) ABSTRACT

A decentralized and/or hybrid decentralized method for secure cryptography key storage referred to as Mutual Dependency Architecture (MDA) includes the steps of encrypting the cryptographic key using an unlock key; encrypting the unlock key using an encryption tool to create an encrypted seed; and storing the encrypted seed; wherein a user must have access to a first storage area in the device and to a second storage area external to the device in order to access the cryptographic key. In one embodiment, the encryption tool is a store key that is stored in unencrypted form in the first storage area, while the encrypted seed is stored in the second storage area. In another embodiment, the encryption tool is a Hardware Security Module (HSM) having an authentication key that is encrypted using a store key and stored in the second storage area, while the encrypted seed and the store key are stored in unencrypted form in the first storage area. The method can be used to build a fully encrypted and permanently secure network and/or internet of devices and/or things, and to exchange messages between devices on the network.

14 Claims, 13 Drawing Sheets

DECENTRALIZED AND/OR HYBRID DECENTRALIZED SECURE CRYPTOGRAPHIC KEY STORAGE METHOD

TECHNICAL FIELD

The present disclosure relates in general to cyber-security and more particularly to secure storage of cryptographic keys on decentralized individual devices.

BACKGROUND

Cryptographic key storage is a massive problem that has plagued cryptography since its inception. Cryptographic key exchange problems were solved with the advent of public cryptography, but securing the private or symmetric keys remains a problem. Centralization of key storage techniques has resulted in a single point of failure where attackers can focus their efforts. Thus, a need exists for a method of decentralized key storage that removes this single point of failure, increasing the security and privacy of the end users who hold the cryptographic keys.

SUMMARY

The present disclosure relates to a hybrid decentralized method for cryptography key storage, which will be referred to hereafter as "mutual dependency architecture." The method uses a server, database, or device, referred to herein as a central authority, with which users or devices must register for authentication. For ease of understanding, the back end of the central authority is extrapolated since there are near infinite possible implementations for such a system. The key storage is completely on the device end, and sensitive components never touch the central authority. The method creates a mutual dependency between the central authority and the subject device for the subject device, to enable the subject device to "unlock" its stored cryptographic keys.

In its most basic form, mutual dependency architecture is achieved as follows. An initial cryptographic key for a device is encrypted by another cryptographic key, referred to here as the "unlock key." The unlock key is encrypted by still another key, referred to as the "store key," creating an encrypted seed. The encrypted seed, which is never stored on the device, is transmitted to the central authority, which requires some form of authentication. The store key is then stored in unencrypted form with the encrypted stored keys. This creates a hybrid-decentralized model without a central point of failure. If the central authority is breached, the data in the central device is rendered useless without the data stored on the devices.

Alternative schemes can be used for additional security measures, such as using hardware security modules (HSM) to encrypt the unlock key, which is then stored locally on the device. The password or security variables for the HSM are then encrypted with the store key, and the encrypted password or security variables are stored on the central authority. This provides an additional layer of protection, since it requires possession of the physical device, as well as access to the central authority, to obtain the stored keys for a device.

DETAILED DESCRIPTION

Glossary of Terms

Device—any unit of electronic equipment or hardware equipment having computing ability.

Central authority—a computing device that can be configured as a server and is capable of authentication and storage.

Cryptographic key—a string of data that is used to lock or unlock cryptographic functions, including authentication, authorization and encryption.

Encrypted stored key—a cryptographic key that has been encrypted and stored on a device.

Unlock key—a cryptographic key used to encrypt an encrypted stored key.

Encrypted seed—an encrypted unlock key.

Store key—a cryptographic key used to encrypt an encrypted seed.

Network—a group of two or more intelligent devices connected by physical or wireless connections and able to communicate with one another; the term refers to internets of things or devices, as well as to conventional computer networks.

As required, detailed embodiments of the present invention are disclosed herein; however, it is to be understood that the disclosed embodiments are merely exemplary of the invention that may be embodied in various and alternative forms. The figures depicting schemes are just a few of all the possible implementations. Therefore, specific structural and functional details disclosed herein are not to be interpreted as limiting, but merely as a representative basis for teaching one skilled in the art to variously employ the present invention.

Figure 1:
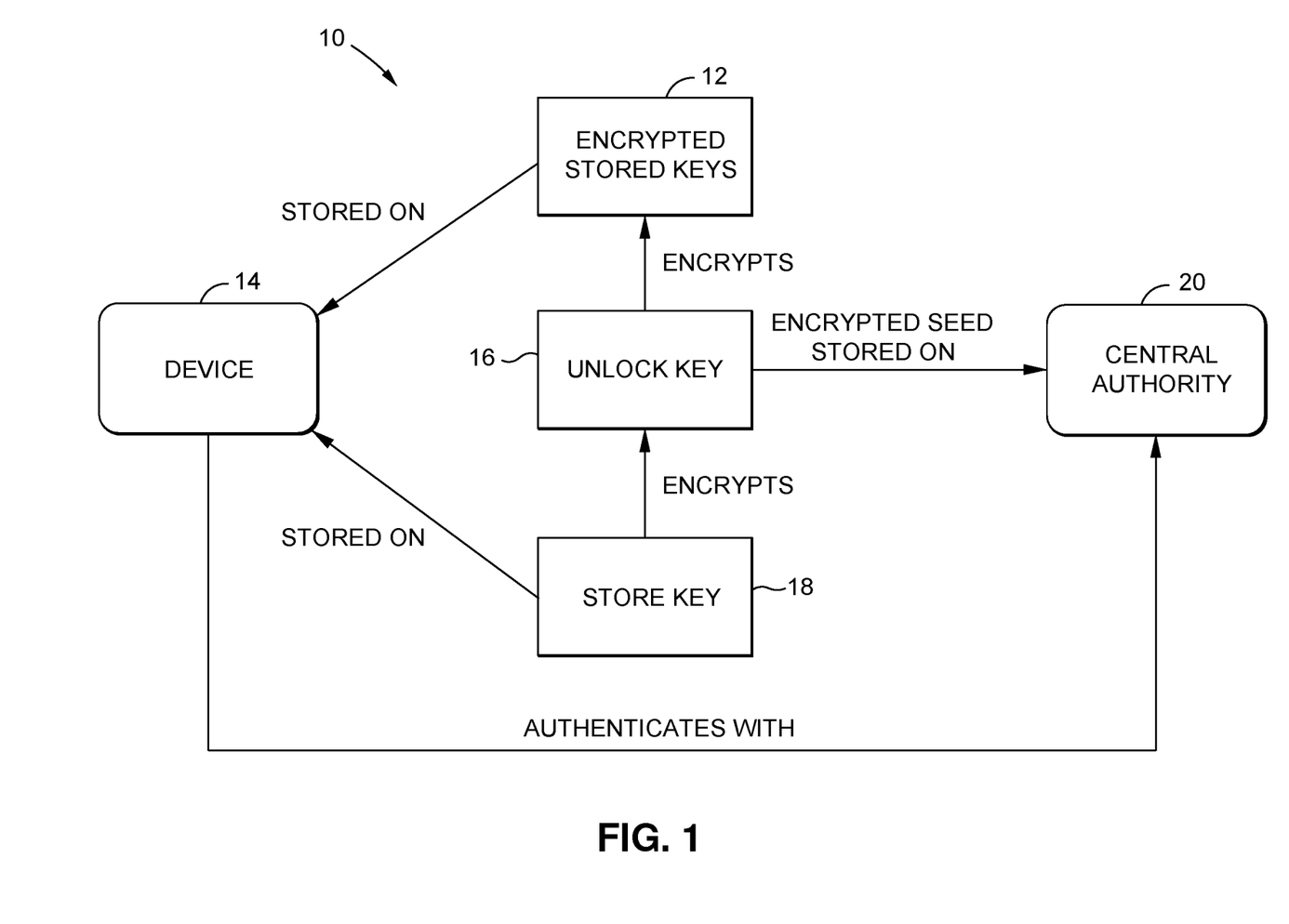
FIG. 1 is a block diagram showing a storage scheme according to first embodiment of the present disclosure.

FIG. 1 shows a basic storage scheme 10 according to the present disclosure. A cryptographic key or set of keys 12 for a device 14 is encrypted by an unlock key 16 and stored on the device 14. The unlock key 16 is encrypted by a store key 18, creating an encrypted seed that is transmitted to a central authority 20 requiring authentication. The amount of security available is dependent on how the central authority 20 is configured and how the authentication is handled. Suitable authentication methods for the central authority 20 may include, but are not limited to, basic username and password, OAuth2, biometrics, and various combinations thereof. The encrypted stored key or keys 12 may by any type of cryptographic keys, such as private/public cryptographic keys pairs, symmetric ciphers, cryptographic keys, and the like. The unlock key 16 and the store key 18 utilize symmetric key ciphers, since symmetric key cyphers offer the most secure form of encryption and do not require public key functionality.

Figure 3:
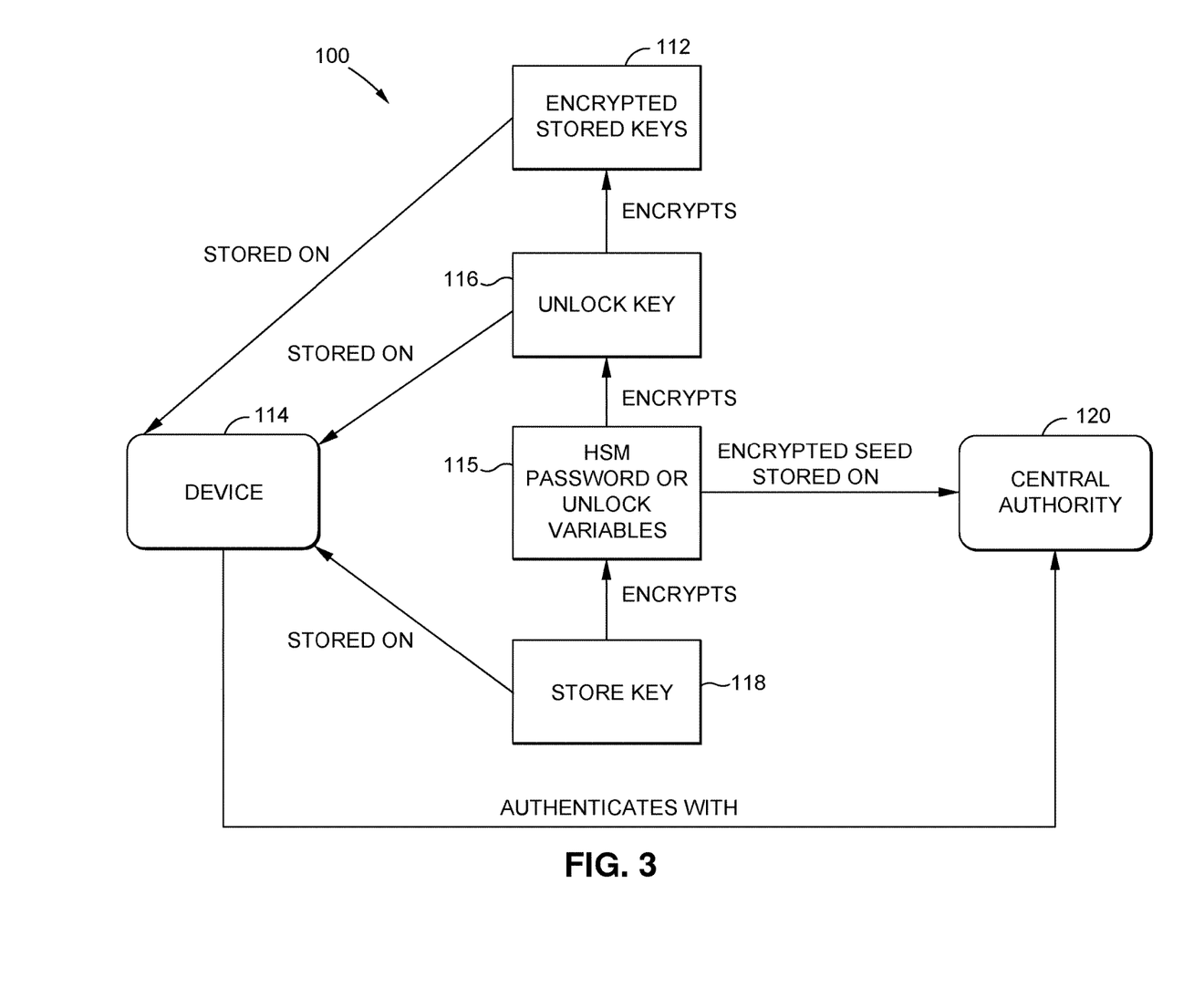
FIG. 3 is a block diagram showing a basic retrieval scheme according to the first embodiment of the present disclosure.

As shown in FIG. 3, retrieval of a cryptographic key stored by the method of FIG. 1 requires the device 14 to authenticate with the central authority 20 and retrieve the encrypted seed. The store key 18 then decrypts the encrypted seed to provide the unlock key 16, which in turn decrypts the decrypted stored keys 12. The decrypted stored keys 12 are then provided in their original form to an end user who requested the unlocking of the keys.

Figure 2:
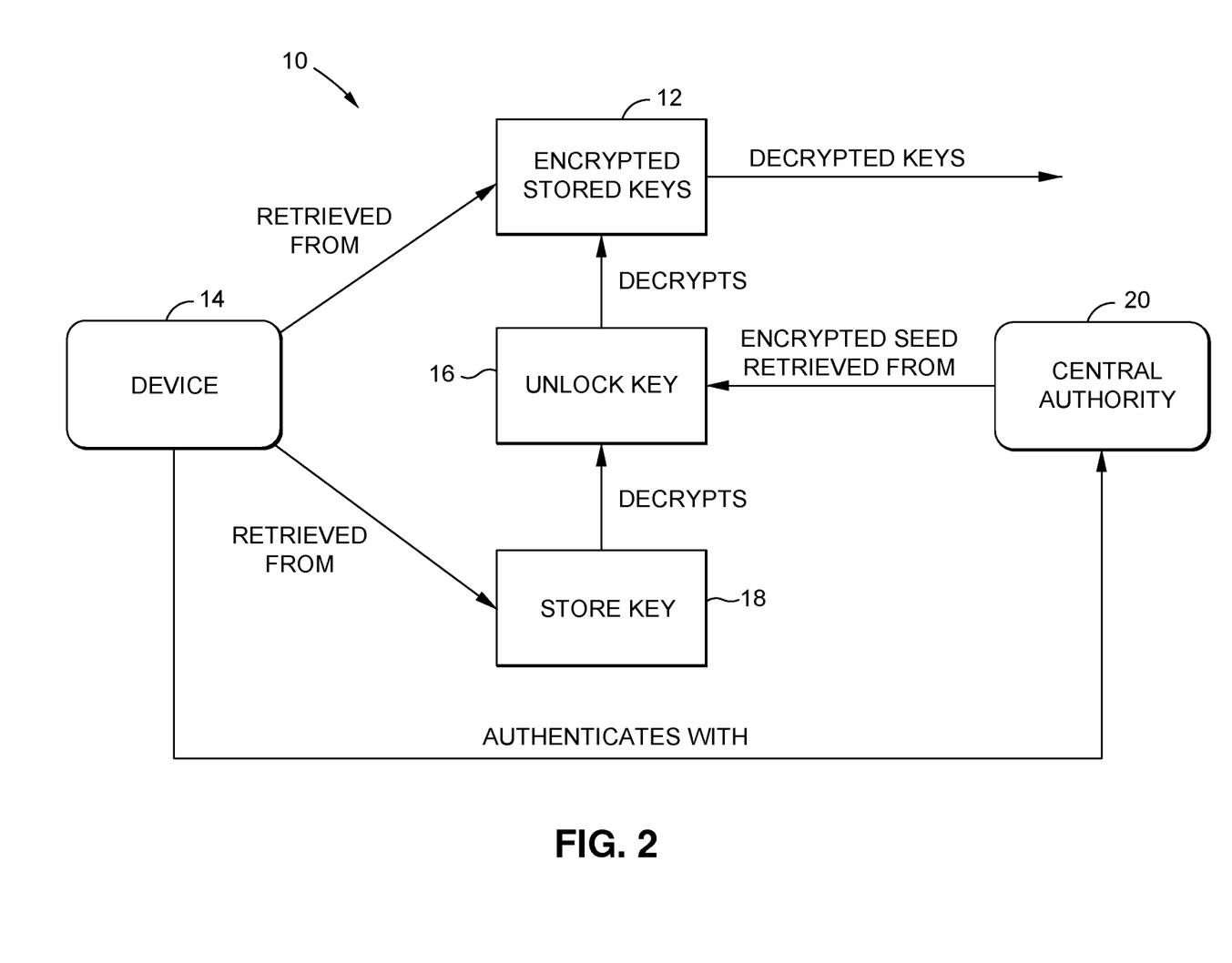
FIG. 2 is a block diagram showing a storage scheme according to a second embodiment of the present disclosure.

The alternative storage scheme 100 shown in FIG. 2 shows how additional security components may be added to the basic scheme to increase the level of security. The architecture of this scheme 100 is essentially the same as the architecture of the scheme 10 shown in FIG. 1, except that the unlock key 116 for the cryptographic key or set of keys 112 for a device 114 is encrypted or "sealed" by a hardware security module (HSM) 115 and stored on the device 114, rather than being encrypted by the store key 118 and stored on the central authority 120. The HSM password or security variables are then encrypted with the store key 118, and the encrypted password or security variables are stored on central authority 120. The encrypted password or security variables are then protected behind the authentication configured for the central authority 120 and not stored on the device 114. The store key 118 is still stored unencrypted, or "naked" on the device 114. This alternative storage scheme 100 has several benefits as it truly binds the encrypted stored keys 112 to the device 114, since the physical hardware security module 115 is needed to decrypt the encrypted stored keys 112. Thus, an attacker must acquire the physical device 114 and access its storage, as well as breaching the central authority 120 to obtain the stored keys for device 114. Other alternative schemes utilizing variations of the same mutual dependency architecture could include, but are not limited to, other localized security methods such as keychain technology, secure device storage, and the like.

Figure 4:
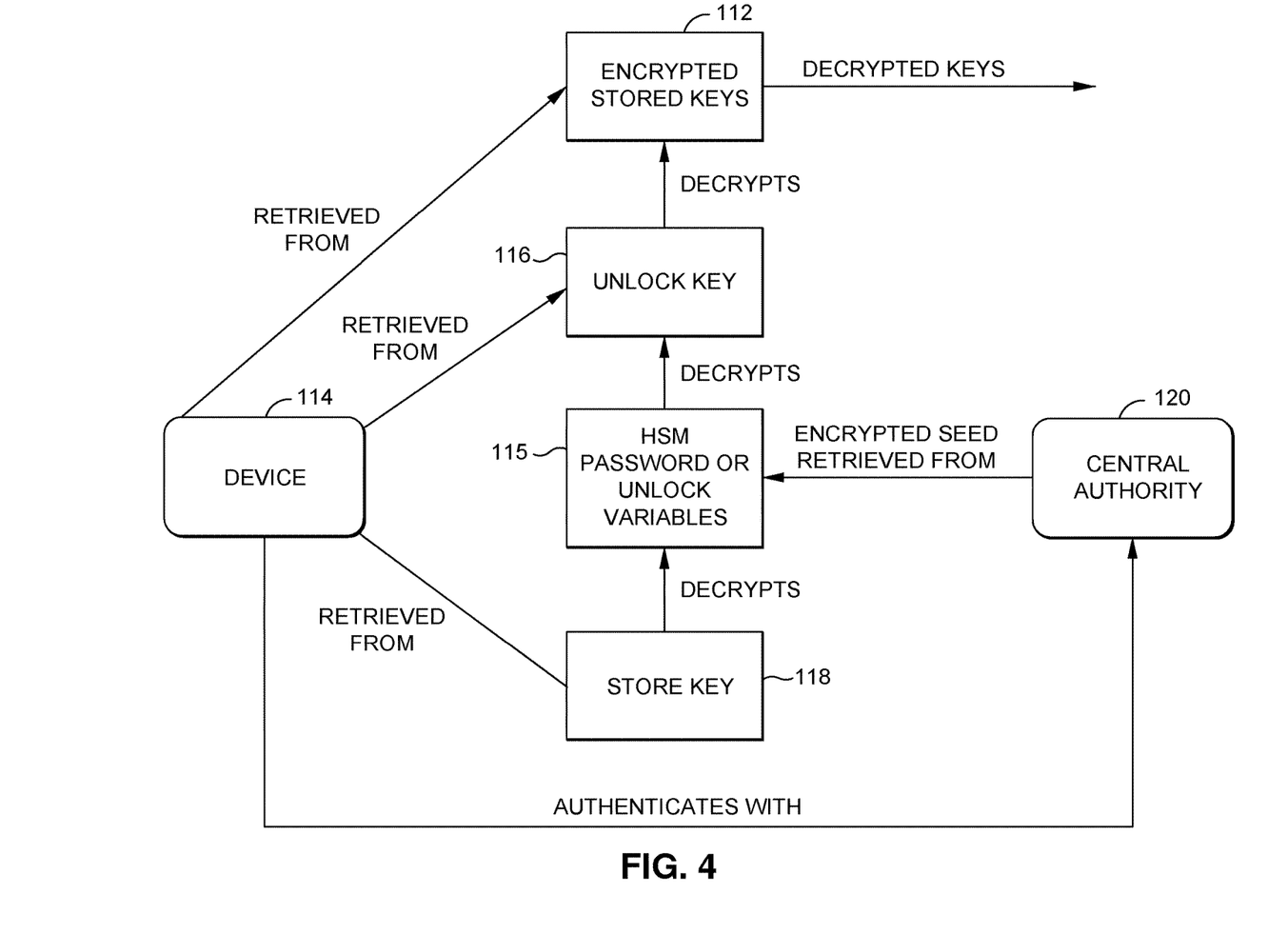
FIG. 4 is a block diagram showing an alternative retrieval scheme according to the second embodiment.

As shown in FIG. 4, retrieval of a cryptographic key stored by the method of FIG. 2 requires the device 114 to authenticate with the central authority 120, and retrieve the encrypted seed, which in this case is the encrypted HSM password or security variables. The store key 118 then decrypts the encrypted seed, allowing the HSM 115 to decrypt the encrypted unlock key 118 using the decrypted password or security variables. The unlock key 116 then decrypts the encrypted stored keys 112, which are in turn provided in their original form to an end user who requested the unlocking of the keys.

The schemes described, as well as the numerous permutations, can serve as the foundation for creating a fully decentralized and encrypted network and/or internet of devices and/or things, since the central authority itself serves as a placeholder and can be any type of computing device. Thus, peer-to-peer authentication and key storage is possible, which will allow for ad-hoc creation of trusted third parties for systems that require a third party.

Figure 5:
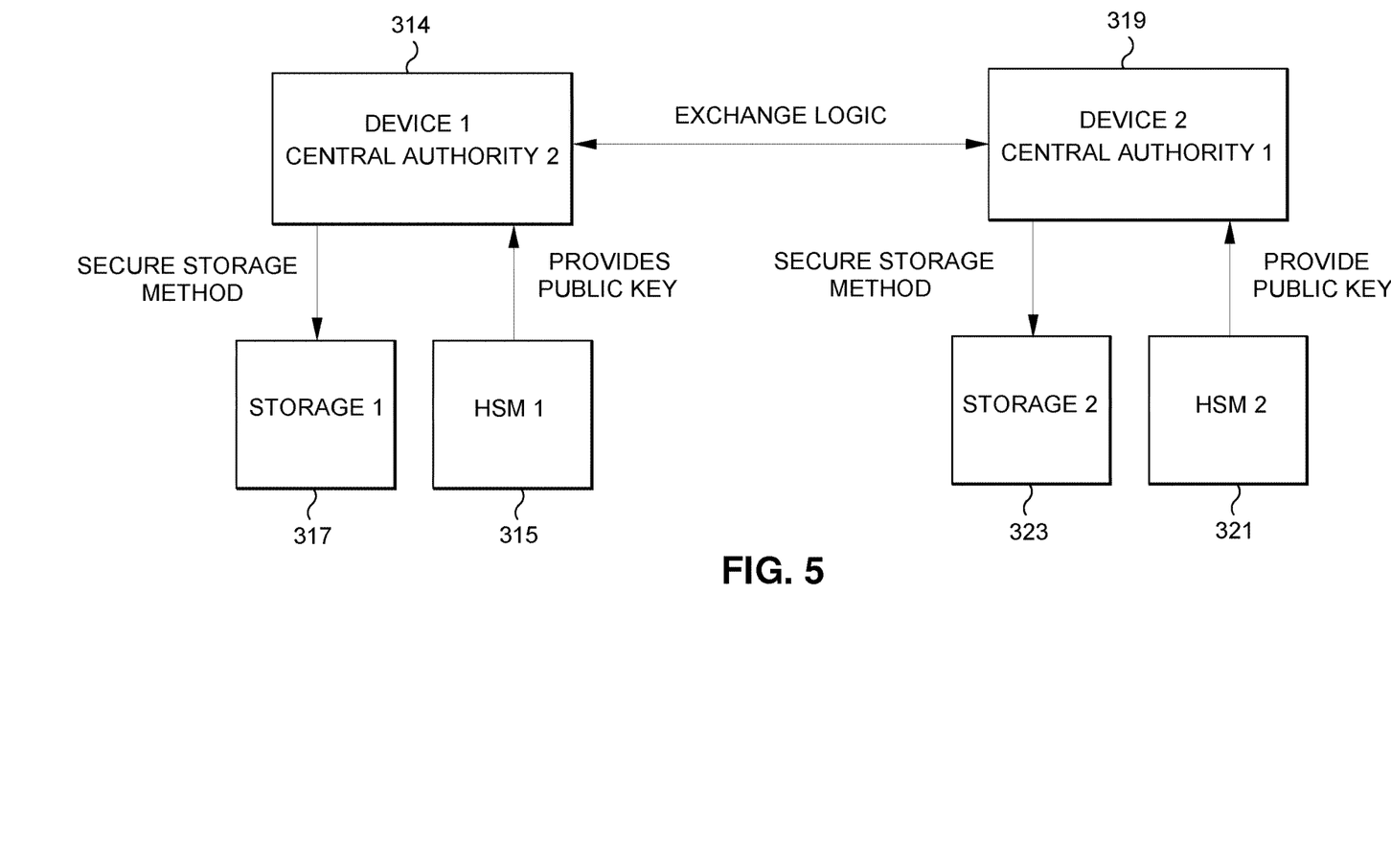
FIG. 5 is a block diagram showing a decentralized method of Mutual Dependency Architecture.

On example of a system using the principles of mutual dependency architecture for peer-to-peer use and implementation is shown in FIG. 5. The system includes a first device 314 having a first HSM 315 and a first storage module 317, and a second device 319 having a second HSM 321 and a second storage module 323. Each HSM contains a public key cryptography system for storing session keys after exchange and use, enabling session key exchanges using the Diffie-Hellman key exchange method. After session keys are no longer needed, they are encrypted and stored using the method described above in connection with FIG. 3, except that each device acts as the central authority for the other device.

A method of decentralized peer-to-peer authentication and key storage using the system of FIG. 5 involves the following steps:
1) The HSM 315 for the first device 314 supplies its public key to the first device 314, and the HSM 321 for the second device 319 stores its public key to the second device 319.
2) The first device 314 and the second device 319 commence a secure key exchange.
3) The first device 314 encrypts the session key for the second device 319 using a first unlock key, and the second device encrypts the session key for the first device 314 using s second unlock key.
4) The first unlock key is encrypted using the HSM 315 for the first device 314, creating a first encrypted seed, and the second unlock key is encrypted using the HSM 321 for the second device 319, creating a second encrypted seed.
5) The first encrypted seed is stored on the first device and the second encrypted seed is stored on the second device.
6) The authentication key for the HSM 315 for the first device 314 is encrypted using a first store key, and the authentication key for the HSM 321 for the second device 321 is encrypted using a second store key.
7) The encrypted authentication key for the first device 314 is stored on the second device, and the encrypted authentication key for the second device is stored on the first device.

The method described above is beneficial since the devices 314 and 319 can simply exchange the encrypted seeds and reuse the session keys if communications are to be reopened. The encrypted seeds could be also exchanged using the Diffie-Hellman method and any risk of a man in the middle attack on the reopening is nullified, since the exchange data is no longer a key, but just encrypted data that is only relevant to the talking devices. Furthermore, there can also be additional authentication steps, such as returning the signature of random of data that is sent encrypted with the requesting device's public key to prove ownership of the public key pair, and thus the encrypted seed. For the authentication steps, the devices could also store each other's public keys after the initial key exchange and use the stored public key as identifiers.

The decentralized peer-to-peer method described above may also be further developed to create a permanent secure network that provides a secure environment for the initial key exchanges between all devices in the network. Such a network may be formed as shown in FIG. 6, by: 1) creating a secure connection between a first device 414 and a second device 419; and 2) initiating a secure key exchange between the two devices 414, 419 using the Diffie-Hellman method.

Once the key exchanges have occurred, both devices 414, 419 have permanent secure communications with each other.

Figure 6:
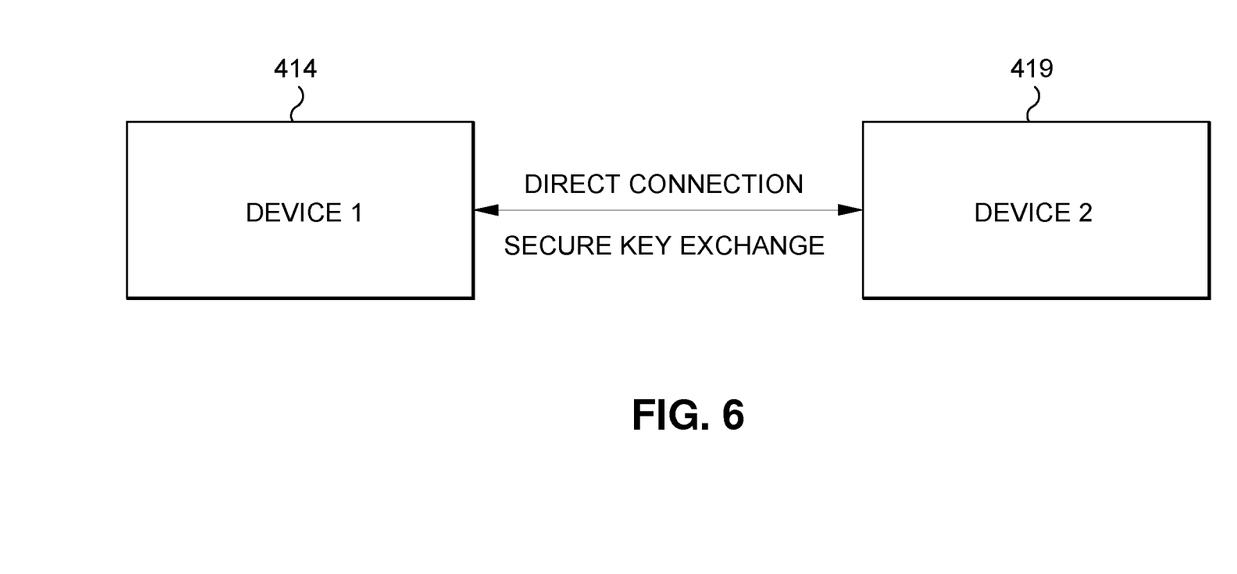
FIG. 6 is a block diagram showing a secure key exchange over a direction connection.
Figure 7:
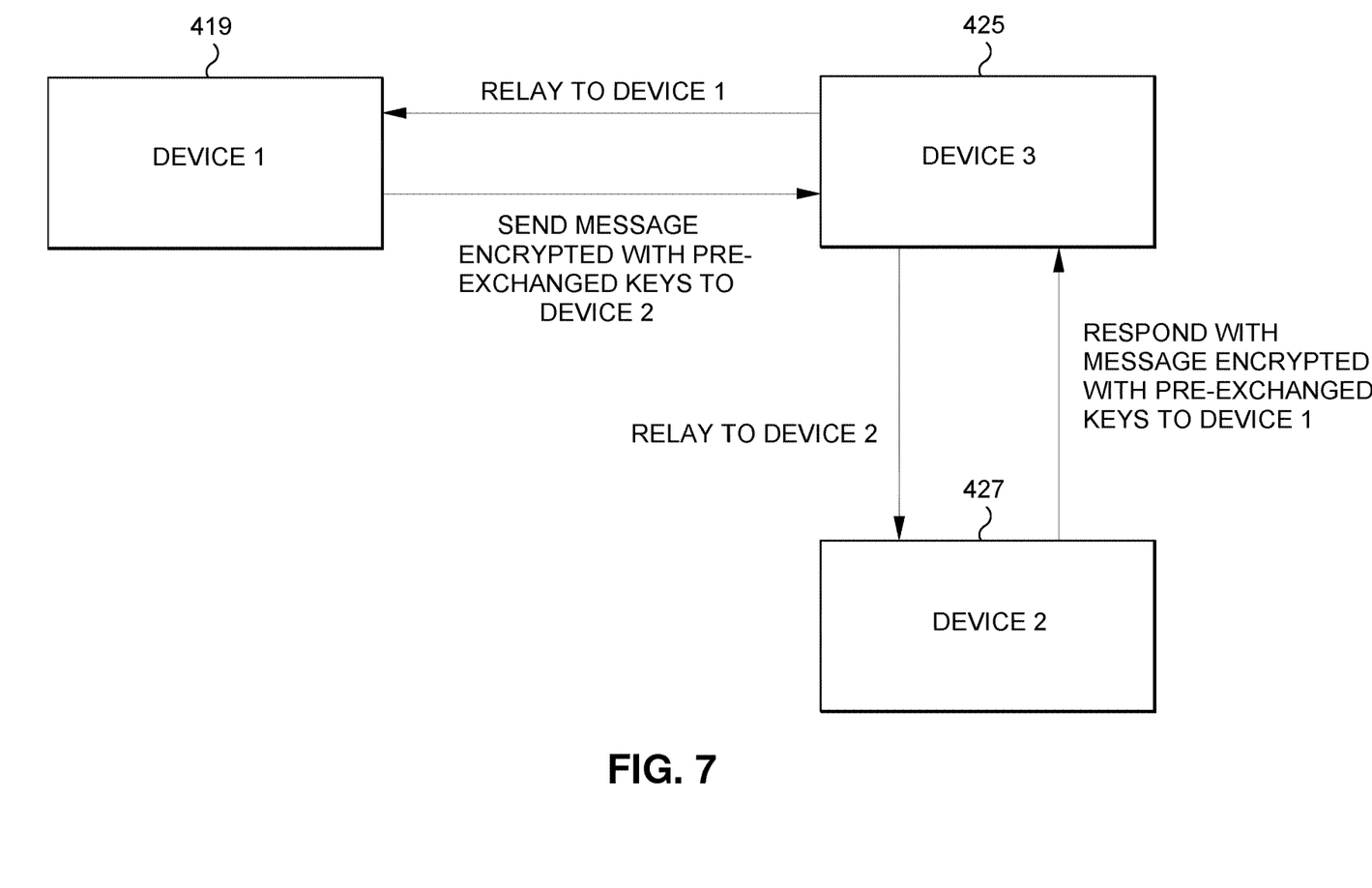
FIG. 7 is a visual description showing how a permanently secure network of devices nodes can communicate when not directly connected.

A method of securely propagating a message through a network formed by the method of FIG. 6 is depicted in FIG. 7, where the first device 414 and second device 419 have previously been paired using the method described above, and a third device 425 acts as an intermediary. Since the first and second devices 414, 419 are pre-paired, communications can be started as though it is in the middle of an encrypted session. The method of FIG. 7 includes the following steps:
1) The first device 414 encrypts the message using the session key it received from the second device 419.
2) The first device 414 sends the encrypted message to the third device 425, which in turn relays the message to the second device 421.
3) The second device 421 re-encrypts the message using the session key it received from the first device 414.
4) The second device 421 sends the re-encrypted message to the third device 425, which in turn relays the message to the first device 414.

Figure 8:
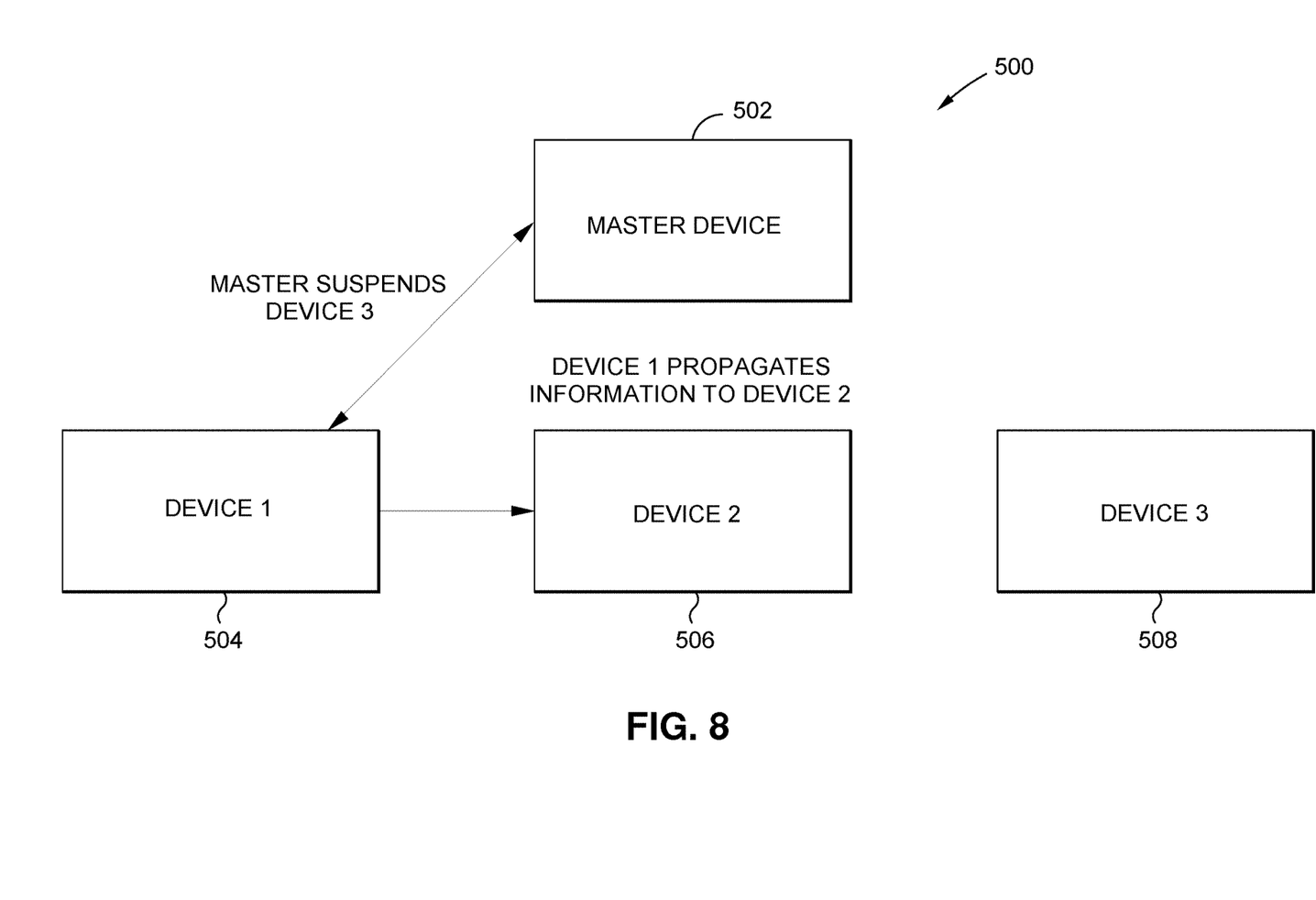
FIG. 8 is a visual description showing how devices can be removed or "blacklisted" from a permanently secure network of devices utilizing a master device only method.

If a network device is lost or taken by a malicious user, that device can simply be excluded or "blacklisted" by the network, and the ability to view its previous conversations will be impossible unless the user also acquires another device from the network. The blacklisting process could be achieved by issuing a command that a public key is invalid through a master device, which will be relayed to all devices throughout the network. The basic schema of this blacklisting or invalidation method is depicted in FIG. 8, which shows a network 500 including a master device 502 and three subsidiary devices. The three subsidiary devices include a first subsidiary device 504 that is directly connected to the master device 502, a second subsidiary device 506 that can communicate with the first subsidiary device 504, and a third subsidiary device 508 that has been lost or stolen. Each of the subsidiary devices 504, 506, and 508 has its own public key, and the master device 502 is capable of invalidating each of these public keys. When the master device 502 is notified that the third subsidiary 508 device has been lost or stolen, it invalidates the public key for the third subsidiary device 508 and notifies the first subsidiary device 504 that the third subsidiary device is no longer a valid network device. The first subsidiary device 504 then relays this information to the second subsidiary device 506.

Figure 9:
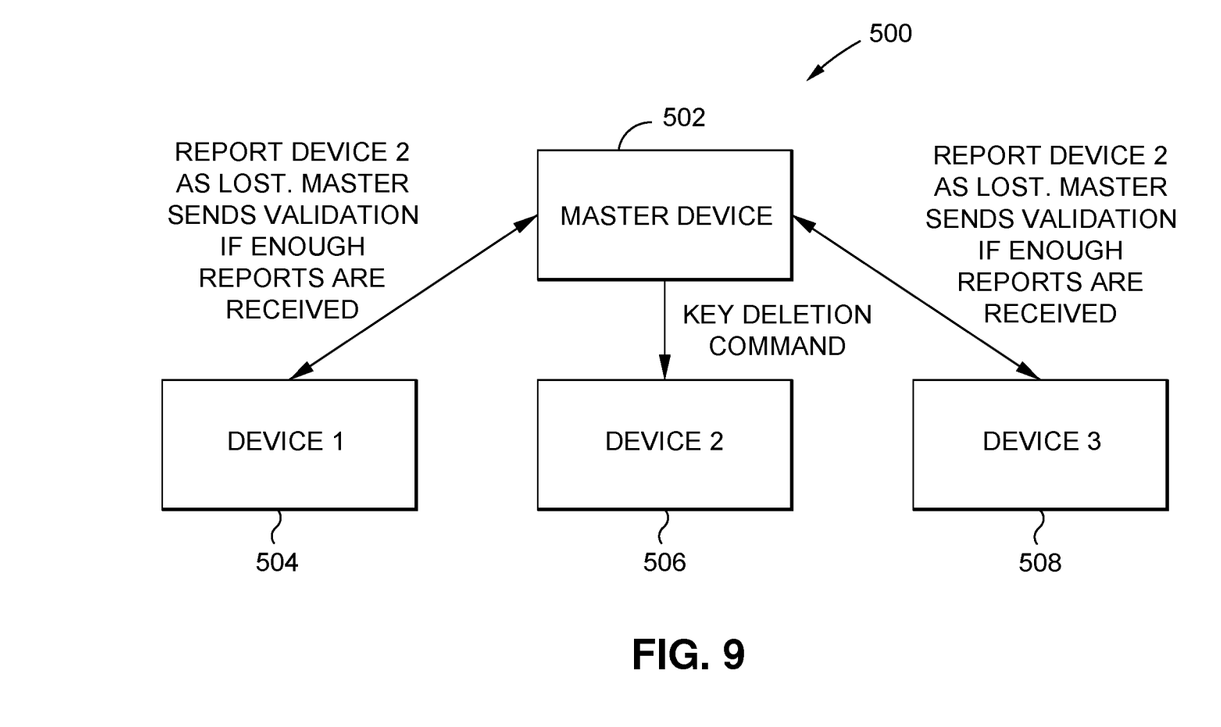
FIG. 9 is a visual description showing how devices can be removed or "blacklisted" from a permanently secure network of devices utilizing a reporting method.

A decentralized approach could also be taken where the submittal of multiple "reports" by trusted network devices that a network device is compromised will result in the invalidation of the reported device's public key. This method is depicted in FIG. 9, which shows the same network 500 as FIG. 8, but where the second auxiliary device 506, rather than the third auxiliary device 508, has been lost, stolen, or captured by malicious users. In this scenario, the first auxiliary device 504 and the third auxiliary device 508 report the loss of the second auxiliary device 506 to the master device 502. When the master device 502 receives a threshold number or reports that the third auxiliary device 508 has been lost, it attempts to render the third auxiliary device 508 by issues it "delete keys" command. The master device 502 then sends invalidation reports to all other devices in the network, using the method described in relation to FIG. 8.

In a hybrid approach, the validity of a reported device's public key can be suspended until it is either permanently revoked by the master device 502 or overridden as valid. In addition, a system could be implemented wherein the master device is identified as compromised if it issues commands on devices that have not been reported by other devices (ie. it reports a device as stolen when no other device has reported that device stolen. This kind of system would be excellent for communicating time-sensitive data where past transmissions have an expiration of their usefulness, since there is vulnerability that previous communications can be seen if the two devices are captured. Granted that such vulnerabilities maybe mitigated by device security mechanisms such as and not limited to biometrics, dual factor authentication, etc., which may prevent the captured devices from being used to begin with.

In some situations, it may be necessary to replace a device in a network, or to do a rolling deployment of a network when a new generation of devices has been introduced. In these situations, it is desirable to create an ad-hoc trusted third party.

Figure 10:
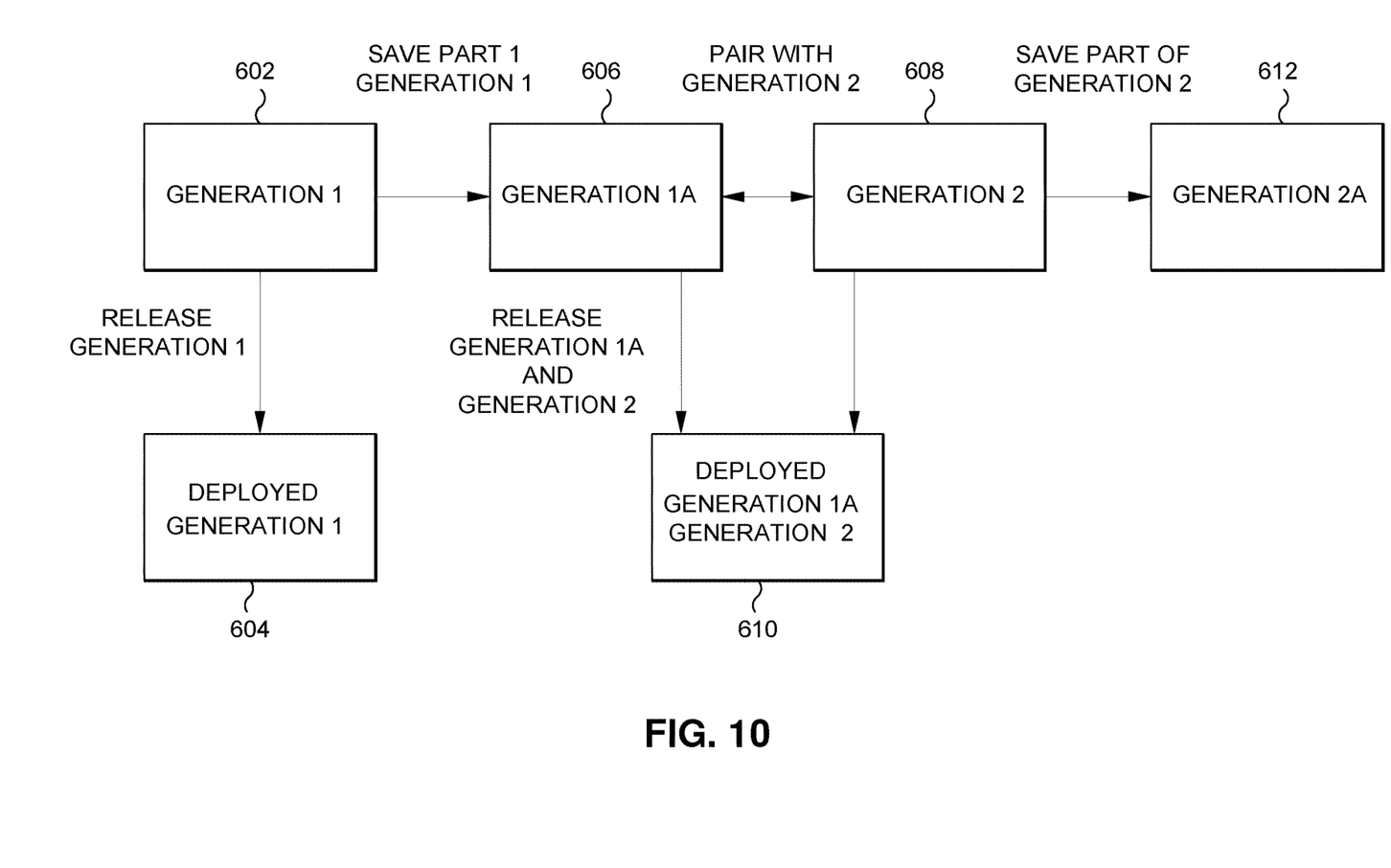
FIG. 10 is a block diagram showing chain deployment.

One method of deploying a decentralized, permanently secure ad-hoc network is shown in FIG. 10. When a first generation 602 of devices is released, all the devices in that generation exchange session keys using a secure pairing method. A first subset of the first generation is deployed to create a first network 604 consisting entirely of first generation devices, while a second subset 606 of the first generation is held in reserve. When a second generation 608 is released, each device in the second generation 608 exchanges exchange session keys with at least one other device in the second generation 608 and at least one device from the second subset 606 of the first generation using a secure pairing method. A first subset of the second generation 608 is then deployed with the second subset 606 of first generation devices to create an ad-hoc second network 610 consisting of both first and second generation devices. A second subset 612 of the second generation is held in reserve for pairing with a future third generation.

Figure 11:
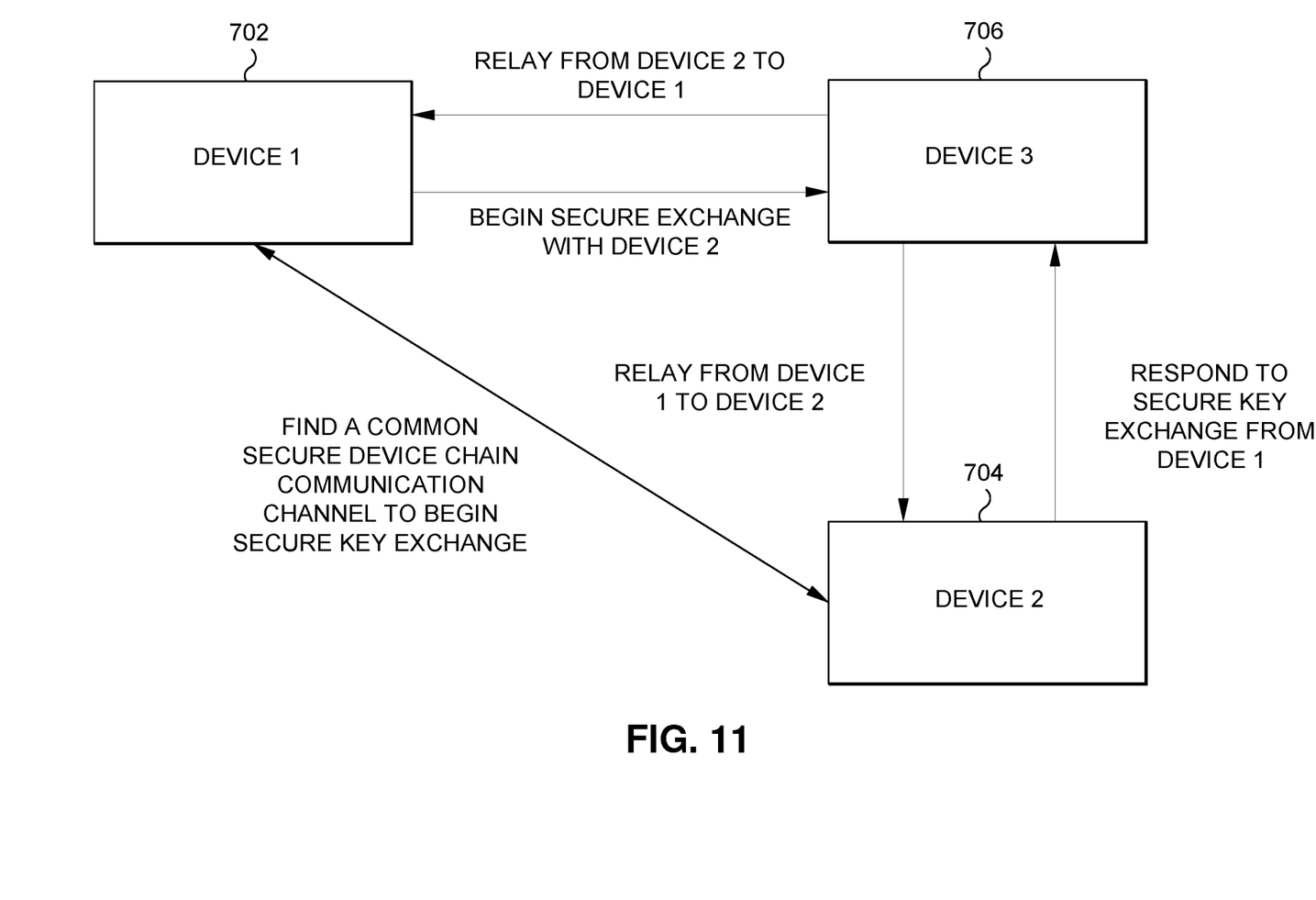
FIG. 11 is a block diagram showing the concept of ad-hoc trusted third parties.

FIG. 11 shows a method for preventing "man in the middle" attacks on an ad hoc network created by the method of FIG. 10. In this scenario, when a second generation device 702 encounters a first generation device 704 it has not exchanged keys with, each device will search for third device 706 that has already exchanged session keys with both devices. Once both the second generation device 702 and the first generation device 704 determine that the third device 706 has previously exchanged keys with both, they designate the third device 06 as a trusted third party. The first and second generation devices 702, 704 then commence a secure key exchange, using the third device 706 as a communication channel. Once the keys are stored and the exchange is completed, second generation device 702 and first generation device 704 can both act as trusted third party for other devices. This method will be referred to hereafter as "chained deployment."

Figure 12:
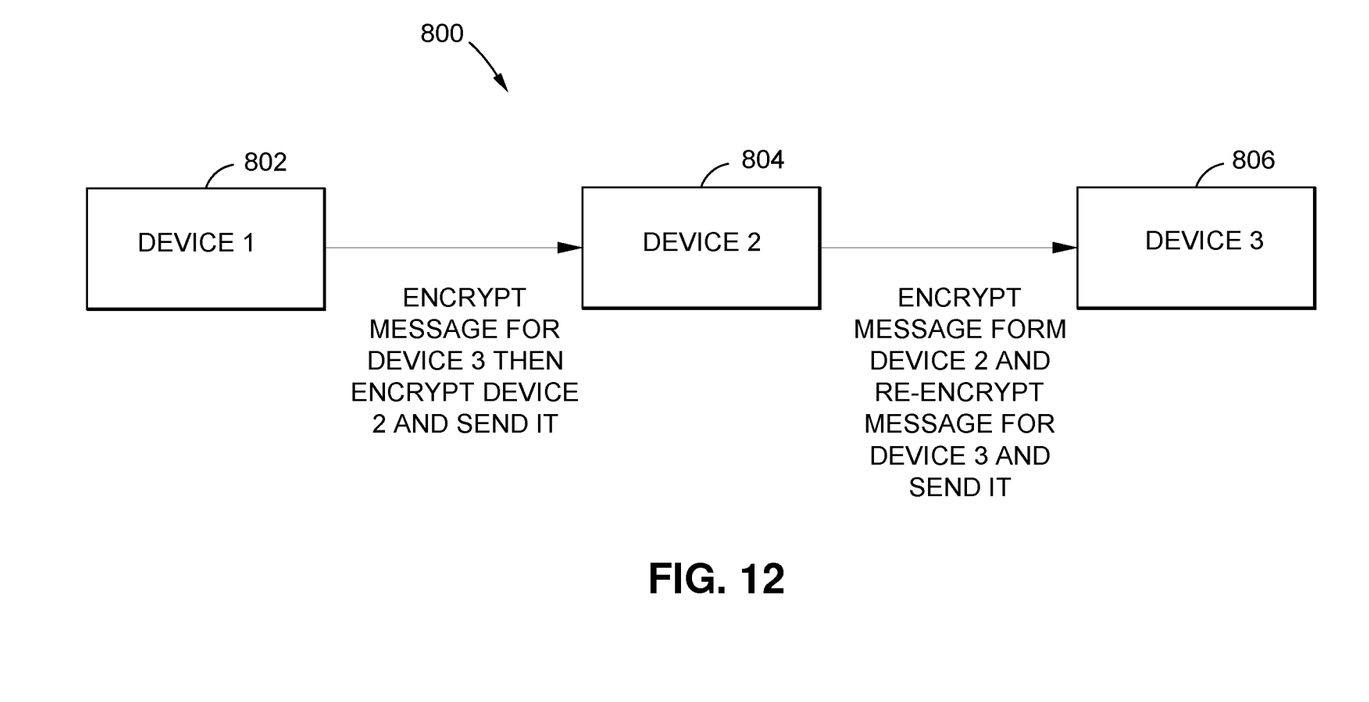
FIG. 12 is a block diagram showing the concept of relay encapsulation.

Communication among the devices of FIGS. 10 and 11 is kept secure using a method, referred to here as "relay encapsulation", which is depicted in FIG. 12. For the sake of simplicity, the method is illustrated here in relation to a network comprising three devices: a first device 802, a second device 804, and a third device 806, where the first device 802 is directly connected to, and has previously swapped session keys with, the second device 804 and the second device 804 is directly connected to, and has previously exchanged session keys with, the third device 806, and where the third device 806 is distant from, or not directly connected to, the first device 802.

The method for propagating an original message $M_O$ through the three-device network 800 of FIG. 12 is as follows:

1) The first device 802 and the third device 806 exchange session keys.
2) The first device 802 computes a secure hash of the original message $M_O$ and appends it to the secure hash of the original message $M_O$ to create an augmented message $M_{1A}$ having a data section and a hash section.
3) The augmented message $M_{1A}$ is encrypted in the first device 802 using the session keys exchanged between the first device 802 and the third device 806 ($S_{1(3)}$) to create an encrypted augmented message $M_{1B}$.
4) The encrypted augmented message $M_{1B}$ is encrypted using the session keys exchanged between the first device 802 and the second device 804 ($S_{1(2)}$) to create a double-encrypted augmented message $M_{1C}$.
5) The double-encrypted augmented message $M_{1C}$ is transmitted to the second device 804.
6) The second device 804 decrypts the double-encrypted augmented message $M_{1C}$ using the session keys exchanged between the first device 802 and the second device ($S_{1(2)}$) to create a single-encrypted augmented message $M_{2B}$.
7) The second device 804 encrypts the single-encrypted augmented message $M_{2B}$ using the session keys exchanged between the second device 804 and the third device 806 ($S_{2(3)}$).
8) The second device 804 transmits the single-encrypted augmented message $M_{2B}$ to the third device 806.
9) The third device decrypts the single-encrypted augmented message $M_{2B}$ twice to receive the plain text original message $M_O$ and verifies its validity by calculating and comparing the decrypted hash and the computed hash.

The method of FIG. 12 can readily be extrapolated to a longer chain of devices $D_1$-$D_n$, wherein each device $D_x$ has previously exchanged session keys with a subsequent device $D_{x+1}$ so that the first device $D_1$ contains the session key $S_{1(2)}$ for the second device $D_2$, every device $D_x$ between the first device $D_1$ and the last device $D_n$ contains the session key $S_{x(x-1)}$ for a previous device $D_{x-1}$ and the session key $S_{x(x+1)}$ for a subsequent device $D_{x+1}$; and the end device $D_n$ contains the session key $S_{n(n-1)}$ for the penultimate device $D_{n-1}$. The method for propagating messages through the longer chain of devices is the same as for the three-device chain, except that a verification step is added at each device to verify whether the endpoint of the transmission has been reached, as shown in the flow chart of FIG. 13. The verification step consists of: attempting to decrypt the single-encrypted augmented message with all stored session keys to create a set of possible messages; computing a hash of the data section of each of the messages; and comparing the hash on the data section of each message with its hash section. If the hash on the data section of any message is the same as the hash of that message, the endpoint has been reached. If not, the single-encrypted augmented message must be re-encrypted and transmitted to the next device, where the entire process is repeated.

Figure 13:
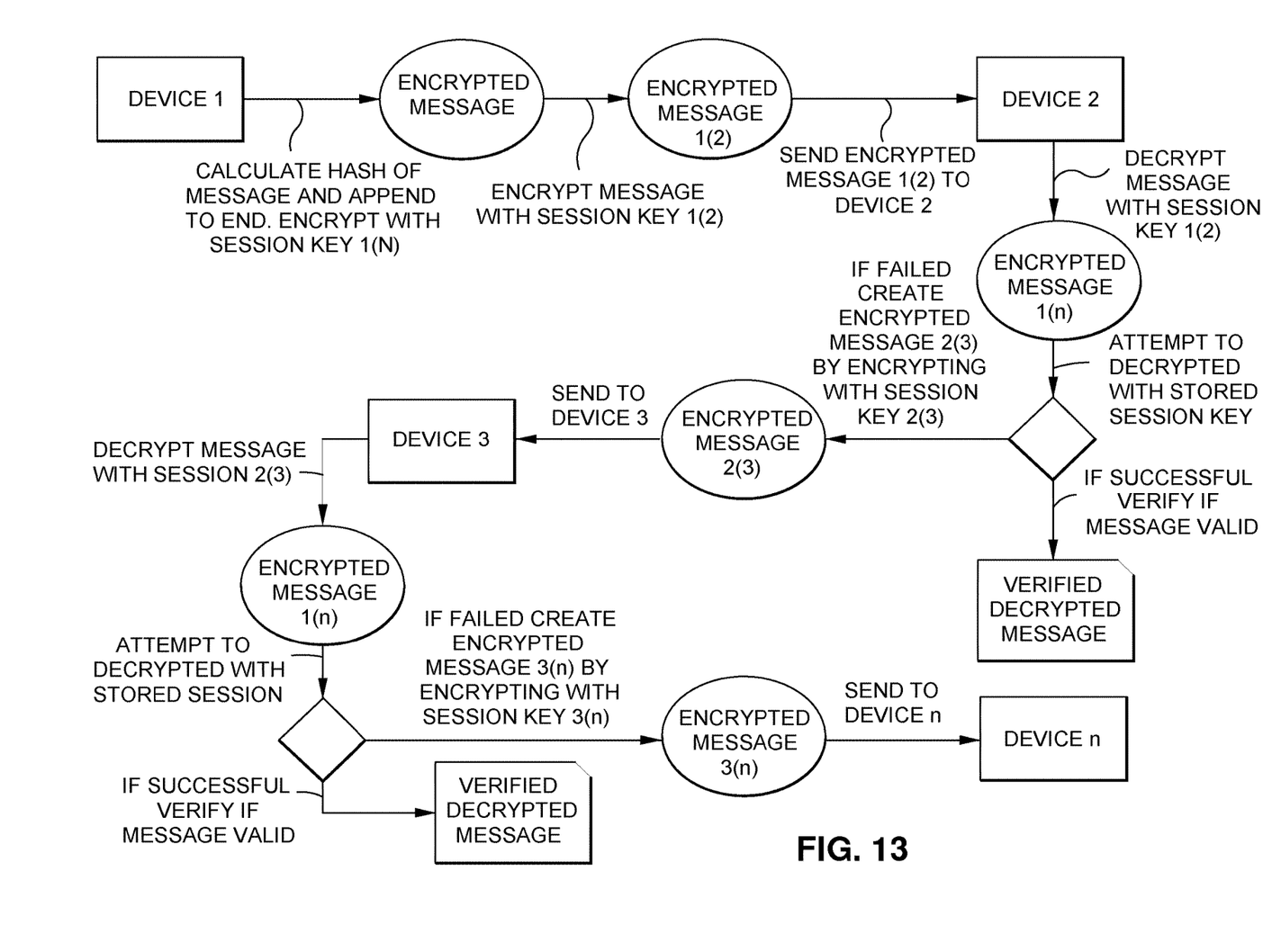
FIG. 13 is a flow chart illustrating method of securely relaying and propagating a message through a decentralized permanently secure network created using the cryptographic key storage methods of the present disclosure.

In some cases, the initial encapsulation step of this method can be skipped, since the messages can be viewed by the relaying devices without risking a security breach.

There are many ways the concept of chained deployment described in connection with FIG. 11 can be deployed. An algorithm or a neural net could determine the ideal exchange pairing per deployment of devices and apply this information to future deployments. For example, an algorithm or neural net may find that the devices that have been held in reserve from the first generation of devices should be spread out over the next five subsequent generations, since as each deployment of devices can differ. This optimization and chain deployment shows that a permanently secure network utilizing mutual dependency architecture need not be static and can adapt to new devices, and lost devices as well, as it is continuously expanded. Mutual dependency architecture allows upgrades to ciphers or other components of the devices to be performed on a rolling basis, since the cryptographic keys stored do not need to be of a single cipher.

An alternative method of deployment, referred to here as "proximity propagation deployment, operates on the assumption that all direct connections are "secure" and performs the initial key exchanges using the method described in connection FIG. 6. Once all the localized pairs have exchanged their session keys, any device within the subnet can be tied to a secure chain of ad-hoc trusted third parties using the method described in connection with FIG. 11. Furthermore, when combined with chained deployment of networking gear, such as switches and routers, propagation can continue to pair routers and switches as needed to create a network with the capabilities needed. Alternatively, the networking gear can simply propagate with its nearest connection. Once propagation is finished, two devices on separate subnets can now begin key exchanges through a chain of ad-hoc trusted third parties. A permanent secure session can be established, or rather for efficiency, the session key can be discarded when its use is no longer needed. A permanent secure session does not need a chain of ad-hoc trusted third parties and can go the most direct route as man in the middle attacks are completely negated.

If a node of the network is malicious or captured, the chain of ad-hoc trusted third parties may become vulnerable to a man-in-the-middle attack. This can be mitigated by chained deployment of "master" servers, which can function as domain name servers. Those master servers could also utilize a form of block chain to create a master ledger of devices and their corresponding identities. Users will register their server's embedded public keys with the master servers so all connecting devices will know what public key to expect from the server response.

What is claimed is:

1. A method for storing a first cryptographic key for a first device $D_1$, wherein the method is used for decentralized peer-to-peer authentication and key storage, comprising:
   encrypting the first cryptographic key using an unlock key;
   encrypting the unlock key using a store key to create an encrypted seed;
   storing the store key in unencrypted form in a first storage area in the first device $D_1$ with the encrypted cryptographic key;
   storing the encrypted seed in a second storage area in a second device $D_2$; and
   storing a second cryptographic key for the second device $D_2$ in the first storage area;
   wherein the first and second devices require authentication.

2. The method of claim 1 used to create a decentralized permanently secure ad-hoc network, further comprising:
   associating the first device $D_1$ with a first hardware security module and the second device $D_2$ with a second hardware security module, wherein both the first device $D_1$ and the second device $D_2$ require authentication;
   using the first hardware security module to provide a first secure public key pair for the first device $D_1$;
   using the second hardware security module to provide a second secure public key pair for the second device $D_2$;

using a random seed from the first device $D_1$ encrypted with the second device's secure public key pair, sent to the second device $D_2$, decrypted by the second device $D_2$, re-encrypted with the first device's secure public key pair, returned to the first device $D_1$, and decrypted and verified by the first device $D_1$ as proof of ownership and authentication of the second device's secure key pair;

using a random seed from the second device $D_2$ encrypted with the first device's secure public key pair, sent to first device $D_1$, decrypted by the first device, re-encrypted with the second device's secure public key pair, returned to the second device $D_2$, and decrypted and verified by the second device $D_1$ as proof of ownership and authentication of the first device's secure key pair;

using the first and second secure key pairs to securely exchange permanent or temporary session keys between the first and second devices;

storing the session key $S_1$ for the first device $D_1$ in the second device $D_2$; and storing the session key $S_2$ for the second device $D_2$ in the first device $D_1$.

3. The method of claim 2, wherein the decentralized permanently secure ad-hoc network comprises an uninterrupted chain of devices $D_1$-$D_n$, wherein each device $D_x$ has previously exchanged session keys with a subsequent device $D_{x+1}$ so that:

the first device $D_1$ contains the session key $S_{1(2)}$ for the second device $D_2$;

every device $D_x$ between the first device $D_1$ and the last device $D_n$ contains the session key $S_{x(x-1)}$ for a previous device $D_{x-1}$ and the session key $S_{x(x+1)}$ for a subsequent device $D_{x+1}$; and the end device $D_n$ contains the session key $S_{n(n-1)}$ for the penultimate device $D_{n-1}$.

4. The method of claim 3, used to securely relay and propagate an original message $M_O$, through the decentralized permanently secure ad-hoc network, comprising:

a) performing a secure key exchange between the first device $D_1$ and the end device $D_n$ over the uninterrupted chain of devices;

b) computing a secure hash of the original message $M_O$ c) appending the secure hash to the end of the original message $M_O$ to create an augmented message $M_{1A}$ having a data section and a hash section d) encrypting the augmented message $M_{1A}$ in the first device $D_1$ using the exchanged session key $S_{1(n)}$ to create an encrypted augmented message $M_{1B}$;

e) encrypting the encrypted augmented message $M_{1B}$ using the session key $S_{1(2)}$ to create a double-encrypted augmented message $M_{1C}$;

transmitting the double-encrypted augmented message $M_{1C}$ to the second device $D_2$;

g) decrypting the double-encrypted augmented message $M_{1C}$ with the session key $S_{1(2)}$ to create a single-encrypted augmented message $M_{2B}$;

h) attempting to decrypt the single-encrypted augmented message $M_{2B}$ with all stored session keys to create possible messages $M_{1A(d)}$, each of the possible messages having a data section and a hash section; and i) computing a hash on the data section of each $M_{1A(d)}$ message and comparing it to the hash section of each $M_{1A(d)}$ message to verify if the endpoint is reached; and j) if not at $D_n$,
i) re-encrypting the single-encrypted augmented message Mm using the session keys $S_{2(3)}$ to create $M_{3C}$,
ii) transmitting $M_{3C}$ to the third device $D_3$,
iii) decrypting the double-encrypted augmented message $M_{3C}$ with the session key $S_{2(3)}$ to create a single-encrypted augmented message M3B having a data section and a hash section,
iv) attempting to decrypt the single-encrypted augmented message $M_{3B}$ with all stored session keys to create possible messages $M_{1A(d)}$,
v) computing a hash on the data section of $M_{1A(d)}$ messages, and
vi) comparing the hash on the data section of $M_{1A(d)}$ to the hash section of the $M_{1A(d)}$ messages to verify if the endpoint is reached; and
vii) if not, at endpoint of transmission,
viii) create $M_{xC}$ from $M_{3B}$ and transmitting $M_{xC}$ to subsequent devices $D_x$, and
ix) repeating steps j) i through j) viii until device $D_n$ is reached.

5. The method of claim 4, wherein the chain of devices is created through IP routing and all non-paired nodes on routing table perform key exchanges.

6. The method of claim 4, wherein each device has a public key and a private key, and the public keys for the first device $D_1$ and the last device Lan are appended to the original message to determine place of origin and end point; and further comprising:

only attempting to decrypt the single encrypted message once the message reaches the endpoint with initially exchanged session keys.

7. The method of claim 4, wherein the chain of devices is assumed trusted to form an ad-hoc chain of trusted third parties.

8. The method of claim 4, used to invalidate and/or remove devices/things on a decentralized permanently secure ad-hoc network, further comprising:

associating an uninterrupted chain of devices with a master device, wherein each device has its own public key and the master device can invalidate the public key for each device; and sending an invalidity message to the master device if any device in the network determines that another device in the network is malicious, prompting the master device to invalidate the public key for the malicious device.

9. The method of claim 2 used to deploy a decentralized ad-hoc network, comprising:

providing a plurality of devices including
at least one localized pair of devices consisting of a first device $D_1$ that has been directly connected to a second device $D_2$ using a secure key exchange, and
at least one distant device Dy; and pairing each device in each localized pair of devices with a distant device Dy by creating an uninterrupted chain of devices $D_1$-$D_n$, wherein each device $D_x$ has previously exchanged session keys with a subsequent device $D_{x+1}$ so that:

the first device $D_1$ contains the session key $S_2$ for the second device $D_2$;

every device $D_x$ between the first device $D_1$ and the last device $D_n$ contains the session key $S_{x-1}$ for a previous device $D_{x-1}$ and the session key $S_{x+1}$ for a subsequent device $D_{x+1}$; and the last device $D_n$ contains the session key for the next-to-last device $D_{n-1}$.

10. The method of claim 9 used to relay and propagate a message through the decentralized ad-hoc network, comprising:

a) performing a secure key exchange between the first device $D_1$ and the end device $D_n$ over the uninterrupted chain of devices;
b) computing a secure hash of the original message $M_O$
c) appending the secure hash to the end of the original message $M_O$ to create an augmented message $M_{1A}$ having a data section and a hash section
d) encrypting the augmented message $M_{1A}$ in the first device $D_1$ using the exchanged session key, to create an encrypted augmented message $M_{1B}$;
e) encrypting the encrypted augmented message $M_{1B}$ using the session key $S_{1(2)}$ to create a double-encrypted augmented message $M_{1C}$;
f) transmitting the double-encrypted augmented message $M_{1C}$ to the second device $D_2$;
g) decrypting the double-encrypted augmented message $M_{1C}$ with the session key $S_{1(2)}$ to create a single-encrypted augmented message $M_{2B}$;
h) attempting to decrypt the single-encrypted augmented message $M_{2B}$ with all stored session keys to create possible messages $M_{1A(d)}$, each of the possible messages having a data section and a hash section; and
i) computing a hash on the data section of each $M_{1A(d)}$ message and comparing it to the hash section of each $M_{1A(d)}$ message to verify if the endpoint is reached; and
(j) if not at $D_n$,
  i) re-encrypting the single-encrypted augmented message $M_{2B}$ using the session keys $S_{2(3)}$ to create $M_{3C}$,
  ii) transmitting Mac to the third device D,
  iii) decrypting the double-encrypted augmented message $M_{3C}$ with the session key $S_{2(3)}$ to create a single-encrypted augmented message M3B having a data section and a hash section,
  iv) attempting to decrypt the single-encrypted augmented message $M_{3B}$ with all stored session keys to create possible messages $M_{1A(d)}$,
  v) computing a hash on the data section of $M_{1A(d)}$ messages, and
  vi) comparing the hash on the data section of $M_{1A(d)}$ messages to the hash section of the $M_{1A(d)}$ messages to verify if the endpoint is reached; and
  vii) if not at endpoint of transmission,
  viii) create $M_{xC}$ from $M_{3B}$ and transmitting to subsequent devices $D_x$, and)
  repeating steps j) i-viii device $D_n$ is reached.

11. The method of claim 10, wherein the chain of devices is created through IP routing and all non-paired nodes on routing table perform key exchanges.

12. The method of claim 1, wherein the store key is a non-hardware-secured encryption key.

13. A method for storing a cryptographic key of a device, comprising:
  encrypting the cryptographic key using an unlock key;
  encrypting the unlock key using an authentication key associated with a hardware security module, thereby creating an encrypted seed;
  storing the unlock key in a first storage area;
  storing the encrypted seed a second storage area separate from the first storage area and external to the device;
  encrypting the authentication key using a store key;
  storing the encrypted authentication key in the second storage area with the encrypted seed; and
  storing the store key in unencrypted form in the first storage area with the unlock key and the encrypted cryptographic key.

14. The method of claim 13, wherein the unlock key is a non-hardware-secured encryption key.

* * * * *